United States Patent
Wang et al.

(10) Patent No.: US 12,477,621 B2
(45) Date of Patent: Nov. 18, 2025

(54) SIDELINK COMMUNICATION METHOD AND COMMUNICATION APPARATUS

(71) Applicant: Huawei Technologies Co., Ltd., Shenzhen (CN)

(72) Inventors: Jun Wang, Shanghai (CN); Haibo Xu, Beijing (CN); Qiang Fan, Shanghai (CN); Xiao Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 446 days.

(21) Appl. No.: 17/941,932

(22) Filed: Sep. 9, 2022

(65) Prior Publication Data

US 2023/0007729 A1 Jan. 5, 2023

Related U.S. Application Data

(63) Continuation of application No. PCT/CN2021/079779, filed on Mar. 9, 2021.

(30) Foreign Application Priority Data

Mar. 10, 2020 (CN) .......................... 202010162936.X

(51) Int. Cl.
*H04W 76/28* (2018.01)
*H04W 76/14* (2018.01)
*H04W 76/23* (2018.01)

(52) U.S. Cl.
CPC ............ *H04W 76/28* (2018.02); *H04W 76/14* (2018.02); *H04W 76/23* (2018.02)

(58) Field of Classification Search
CPC ..... H04W 76/28; H04W 76/14; H04W 76/23; H04W 52/0216; H04W 4/40;
(Continued)

(56) References Cited

U.S. PATENT DOCUMENTS 10,708,861 B2 7/2020 Xu et al.
11,290,863 B2 3/2022 Shrivastava et al.
(Continued)

FOREIGN PATENT DOCUMENTS

CN 108307486 A 7/2018
CN 109479189 A 3/2019
(Continued)

OTHER PUBLICATIONS

"New WID on NR Sidelink Enhancement," Source: LG Electronics, Document for: Approval Agenda Item: 9.1.1, 3GPP TSG RAN Meeting #86, RP-193231 (revision of RP-193134), Sitges, Spain, Dec. 9-12, 2019, 6 pages.
(Continued)

*Primary Examiner* — Brian T O Connor
(74) *Attorney, Agent, or Firm* — Slater Matsil, LLP

(57) ABSTRACT

This application provides a sidelink communication method. The method includes: A first terminal device determines one or more pieces of first configuration information, where the one or more pieces of first configuration information correspond to one or more sidelinks, each piece of the first configuration information is used to configure a discontinuous reception DRX related parameter of a corresponding sidelink, and the first terminal device is a sending device or a receiving device on the one or more sidelinks. The first terminal device maintains, based on each piece of the first configuration information, a status of the discontinuous reception DRX corresponding to each piece of the first configuration information.

15 Claims, 4 Drawing Sheets

(58) Field of Classification Search
CPC . H04W 24/02; H04W 52/0209; H04W 76/15; H04W 92/18; H04W 76/27; Y02D 30/70; H04L 5/0098; H04L 5/0091
See application file for complete search history.

(56) References Cited

U.S. PATENT DOCUMENTS

| | | | | |
|---|---|---|---|---|
| 11,510,278 | B2* | 11/2022 | Pan | H04W 76/28 |
| 12,089,282 | B2* | 9/2024 | Van Phan | H04W 76/14 |
| 2017/0303215 | A1 | 10/2017 | Kim et al. | |
| 2018/0206252 | A1 | 7/2018 | Thangarasa et al. | |
| 2019/0098689 | A1 | 3/2019 | Wei et al. | |
| 2022/0022167 | A1* | 1/2022 | Jha | H04W 72/02 |
| 2023/0059876 | A1* | 2/2023 | Pan | H04L 5/0055 |
| 2024/0107626 | A1* | 3/2024 | Pan | H04W 72/23 |

FOREIGN PATENT DOCUMENTS

| | | |
|---|---|---|
| KR | 20190039101 A | 4/2019 |
| WO | 2018064477 A1 | 4/2018 |

OTHER PUBLICATIONS

"3rd Generation Partnership Project; Technical Specification Group Services and System Aspects; Study on enhancement of 3GPP Support for 5G V2X Services (Release 16)," 3GPP TR 22.886 V16.2.0, Dec. 2018, 76 pages.

"3rd Generation Partnership Project; Technical Specification Group Services and System Aspects; Enhancement of 3GPP support for V2X scenarios; Stage 1(Release 16)," 3GPP TS 22.186 V16.2.0, :Jun. 2019, 18 pages.

"3rd Generation Partnership Project; Technical Specification Group Radio Access Network; NR; NR and NG-RAN Overall Description; Stage 2 (Release 16)," 3GPP TS 38.300 V16.0.0, Dec. 2019, 101 pages.

"3rd Generation Partnership Project; Technical Specification Group Radio Access Network; NR; Medium Access Control (MAC) protocol specification (Release 15)," 3GPP TS 38.321 V15.8.0, Dec. 2019, 78 pages.

"3rd Generation Partnership Project; Technical Specification Group Radio Access Network; NR; Radio Resource Control (RRC) protocol specification (Release 15)," 3GPP TS 38.331 V15.8.0, Dec. 2019, 532 pages.

Intel Corporation, "Text Proposal for 3GPP TR 36.746 Capturing RAN1 Agreements on FeD2D Study Item", 3GPP TSG RAN WG1 Meeting #90, R1-1715173, Prague, Czech Republic, Aug. 21-25, 2017, 8 pages.

* cited by examiner

200

S210: Determine a status of one or more pieces of DRX

S220: Determine that a status of at least one of the one or more pieces of DRX is DRX active time S230: Receive or send data on a sidelink corresponding to the at least one piece of DRX

SIDELINK COMMUNICATION METHOD AND COMMUNICATION APPARATUS

CROSS-REFERENCE TO RELATED APPLICATIONS

This application is a continuation of International Application No. PCT/CN2021/079779, filed on Mar. 9, 2021, which claims priority to Chinese Patent Application No. 202010162936.X, filed on Mar. 10, 2020. The disclosures of the aforementioned applications are herein incorporated by reference in their entireties.

TECHNICAL FIELD

This application relates to the communication field, and more specifically, to a sidelink communication method and a communication apparatus.

BACKGROUND

Development of an intelligent transportation system (ITS) promotes development of an Internet of Vehicles (IoV) from a conventional Internet of Vehicles that supports only an in-vehicle information service to a next-generation Internet of Vehicles that supports a vehicle-to-everything (V2X) service. Applications of a V2X system include a vehicle to vehicle (V2V) application, a vehicle to infrastructure (V2I) application, a vehicle to pedestrian (V2P) application, a vehicle to network (V2N) application, and the like. The applications of the V2X system will improve driving safety, reduce congestion, reduce vehicle energy consumption, improve traffic efficiency, and provide in-vehicle infotainment information. The 3rd Generation Partnership Project (3GPP) formulates a related communication standard for V2X in a long term evolution (LTE) system. V2X is also a hot topic for discussion in a new radio (NR) system. NR-V2X needs to support a more complex scenario, for example, a unicast scenario, a broadcast scenario, or a multicast scenario. With expansion of application scenarios and an increasing service requirement, there is a high requirement for reducing power consumption of a device in V2X and improving communication reliability.

SUMMARY

This application provides a sidelink communication method and a communication apparatus, to reduce power consumption of a terminal device and improve communication reliability.

According to a first aspect, a sidelink communication method is provided. The method may be performed by a first terminal device or a module (for example, a chip) configured on (or used in) the first terminal device. The following describes the method by using an example in which the method is performed by the first terminal device.

The method includes: The first terminal device determines one or more pieces of first configuration information, where the one or more pieces of first configuration information correspond to one or more sidelinks, each piece of the first configuration information is used to configure a discontinuous reception DRX related parameter of a corresponding sidelink, and the first terminal device is a sending device or a receiving device on the one or more sidelinks. The first terminal device maintains, based on each piece of the first configuration information, a status of the discontinuous reception DRX corresponding to each piece of the first configuration information.

According to the foregoing solution, when pieces of DRX are configured for a plurality of sidelinks of the terminal device, the terminal device maintains DRX of each sidelink based on configuration information corresponding to the sidelink. This can avoid a communication failure caused by obfuscation of a plurality of pieces of maintained DRX, reduce power consumption, and ensure communication reliability.

With reference to the first aspect, in some implementations of the first aspect, that the first terminal device determines one or more pieces of configuration information includes: The first terminal device determines, based on a first message of each of the one or more sidelinks, the first configuration information corresponding to each sidelink, where the first message of each sidelink includes the first configuration information corresponding to each sidelink. For example, the first message is received by the first terminal device from at least one of the following devices: a sending device on each sidelink, a receiving device on each sidelink, or a network device.

With reference to the first aspect, in some implementations of the first aspect, that the first terminal device determines one or more pieces of configuration information includes: The first terminal device determines, based on system pre-configuration information of the first terminal device, the one or more pieces of first configuration information.

With reference to the first aspect, in some implementations of the first aspect, the first configuration information includes one or more of the following parameters:
  a first cycle of the DRX;
  a second cycle of the DRX, where the second cycle is less than the first cycle;
  a start time offset of the DRX;
  a parameter of a first timer, where the parameter of the first timer indicates DRX active duration in each cycle;
  a parameter of a second timer, where the parameter of the second timer indicates duration in which the receiving device stops receiving transmission of a HARQ process after receiving sidelink control information SCI for scheduling scheduled data of the HARQ process;
  a parameter of a third timer, where the parameter of the third timer indicates maximum DRX active duration of the receiving device for receiving SCI for scheduling retransmitted data of a HARQ process;
  a parameter of a fourth timer, where the parameter of the fourth timer indicates duration in which the receiving device stays in DRX active time after receiving SCI for scheduling newly transmitted data; or
  a parameter of a fifth timer, where the parameter of the fifth timer indicates duration of the DRX in a second cycle.

According to the foregoing solution, DRX of each sidelink is configured based on configuration information of the DRX corresponding to the sidelink, so that the terminal device maintains the DRX of the corresponding sidelink based on the configuration information of the DRX.

With reference to the first aspect, in some implementations of the first aspect, the method further includes: When DRX corresponding to one of the one or more sidelinks applies the first cycle, the first terminal device starts or restarts, based on the first cycle and/or a start time offset of the DRX corresponding to the sidelink, a first timer of the DRX corresponding to the sidelink; or when DRX corresponding to one of the one or more sidelinks applies the second cycle, the first terminal device starts or restarts, based on the second cycle and/or a start time offset of the DRX corresponding to the sidelink, a first timer of the DRX corresponding to the sidelink.

According to the foregoing solution, the first timer is started at start time of a DRX cycle corresponding to each link, and DRX corresponding to the sidelink is in an active state in a period in which the first timer runs. That is, the power consumption of the terminal device can be reduced.

With reference to the first aspect, in some implementations of the first aspect, the method further includes: After the first terminal device sends or receives first sidelink control information SCI in DRX active time of the sidelink of the one or more sidelinks, the first terminal device starts or restarts a second timer corresponding to a first HARQ process, and/or stops a third timer corresponding to the first HARQ process. For example, the first SCI is used to schedule newly transmitted data or retransmitted data of the sidelink, and the first HARQ process is a HARQ process used by the first terminal device to process the newly transmitted data or the retransmitted data. In a period in which the third timer runs, a receiving device of the sidelink stops receiving data of the first HARQ process.

According to the foregoing solution, after receiving or sending the SCI for scheduling the data (the retransmitted data or the newly transmitted data), the terminal device starts the second timer, and the receiving device stops receiving the data of the first HARQ process in the period in which the third timer runs. In this way, the power consumption of the terminal device can be reduced.

With reference to the first aspect, in some implementations of the first aspect, the method further includes: After the second timer corresponding to the first HARQ process expires, the first terminal device starts or restarts the third timer corresponding to the first HARQ process. The first terminal device receives or sends the data of the first HARQ process in the period in which the third timer runs.

With reference to the first aspect, in some implementations of the first aspect, the first terminal device is a receiving device of the sidelink, and that the first terminal device starts or restarts the third timer corresponding to the first HARQ process includes: When the first terminal device fails to decode data of the first HARQ process, the first terminal device starts or restarts the third timer corresponding to the first HARQ process.

According to the foregoing solution, if the terminal device does not successfully decode the data of the first HARQ process in a period in which the second timer runs, the terminal device starts the third timer after the second timer expires, to receive the retransmitted data of the first HARQ process. This provides a possibility of successfully decoding the data of the first HARQ process, and the communication reliability can be improved.

With reference to the first aspect, in some implementations of the first aspect, the method further includes: After the first terminal device sends or receives second SCI in the DRX active time of the sidelink of the one or more sidelinks, the first terminal device starts a fourth timer corresponding to the sidelink. For example, the second SCI is used to schedule the newly transmitted data of the sidelink. In a period in which the fourth timer runs, the DRX of the sidelink is in the active state.

With reference to the first aspect, in some implementations of the first aspect, the method further includes: After the fourth timer corresponding to the sidelink of the one or more sidelinks expires, or after the first terminal device sends or receives third information of the sidelink corresponding to the DRX, if first configuration information corresponding to the sidelink includes the second cycle of the DRX, the first terminal device starts a DRX operation in the second cycle of the sidelink, and starts or restarts a fifth timer corresponding to the sidelink; or if first configuration information corresponding to the sidelink does not include the second cycle, the first terminal device starts a DRX operation in the first cycle of the sidelink. For example, the third information indicates to stop the first timer and/or the fourth timer.

According to the foregoing solution, a periodic DRX operation is resumed on the sidelink after the fourth timer expires. If a DRX operation with a short periodicity (namely, the second cycle) is configured, the first terminal device starts the DRX operation with a short periodicity. In this way, the power consumption of the terminal device can be reduced, and the communication reliability can be improved.

With reference to the first aspect, in some implementations of the first aspect, the method further includes: If the fifth timer corresponding to the sidelink expires, the first terminal device starts the DRX operation in the first cycle corresponding to the sidelink.

With reference to the first aspect, in some implementations of the first aspect, the method further includes: After the first terminal device sends or receives first information in the sidelink of the one or more sidelinks, the first terminal device starts the DRX operation in the first cycle corresponding to the sidelink, where the first information indicates that the first terminal device starts the DRX operation in the first cycle.

With reference to the first aspect, in some implementations of the first aspect, the method further includes: After the first terminal device sends or receives second information in the sidelink of the one or more sidelinks, the first terminal device starts the DRX operation in the second cycle corresponding to the sidelink, where the second information indicates that the first terminal device starts the DRX operation in the second cycle.

According to the foregoing solution, after the terminal device stops the active state of the DRX of the sidelink based on an indication of the information, the terminal device continues to perform the DRX operation according to a corresponding rule, so that the power consumption of the terminal device can be reduced.

With reference to the first aspect, in some implementations of the first aspect, the method further includes: When the first terminal device sends or receives at least one of the first information, the second information, or the third information in the sidelink of the one or more sidelinks, the first terminal device stops the first timer and/or the fourth timer.

According to the foregoing solution, the first timer and/or the fourth timer are/is stopped based on an indication of the information, that is, the DRX of the sidelink enters an inactive state. For example, when no data needs to be sent, the receiving device may be notified of disabling receiving. However, this application is not limited thereto. In this way, the power consumption of the terminal device can be reduced.

With reference to the first aspect, in some implementations of the first aspect, the method further includes: The receiving device of the sidelink is in the DRX active time in one or more of the following cases:

in a period in which the first timer corresponding to the sidelink runs;
in a period in which the fourth timer corresponding to the sidelink runs;

in a period in which a third timer corresponding to at least one HARQ process in the sidelink runs; or in a time domain range of a configured grant resource of the sidelink.

According to the foregoing solution, the receiving device and a sending device of the sidelink reach a consensus on the DRX active time of the sidelink, and send or receive data in the DRX active time, so that the communication reliability can be ensured.

With reference to the first aspect, in some implementations of the first aspect, the method further includes: When the first terminal device sends or receives first data on the configured grant resource, the first terminal device starts a third timer corresponding to a second HARQ process, where the first data is data of the second HARQ process in the sidelink.

With reference to the first aspect, in some implementations of the first aspect, the first terminal device is a sending device on the one or more sidelinks, and the method further includes: The first terminal device determines a first resource. The first terminal device determines a second terminal device in the receiving device on the one or more sidelinks, where DRX active time of the second terminal device partially or completely overlaps the first resource in time domain. The first terminal device sends data to the second terminal device on the first resource.

With reference to the first aspect, in some implementations of the first aspect, the first resource is a resource granted by the network device to the first terminal device for sending sidelink data, or the first resource is a resource obtained by the first terminal device from a sidelink resource used for contention.

According to the foregoing solution, the terminal device determines the receiving device based on the resource obtained through contention or the resource granted by the network device to the terminal device, where the DRX active time of the receiving device partially or completely overlaps the resource in the time domain. In this way, resource utilization can be improved, and the communication reliability can be ensured.

According to a second aspect, a sidelink communication method is provided. The method may be performed by a first terminal device or a module (for example, a chip) configured on (or used in) the first terminal device. The following describes the method by using an example in which the method is performed by the first terminal device.

The method includes: The first terminal device determines a first resource. The first terminal device determines a second terminal device in a receiving device on the one or more sidelinks, where DRX active time of the second terminal device partially or completely overlaps the first resource in time domain. The first terminal device sends data to the second terminal device on the first resource.

With reference to the second aspect, in some implementations of the second aspect, that the first terminal device determines a first resource includes: The first terminal device receives sidelink grant information sent by a network device; and/or the first terminal device obtains the first resource from a sidelink resource used for contention.

With reference to the second aspect, in some implementations of the second aspect, the method further includes: The first terminal device determines one or more pieces of first configuration information, where the one or more pieces of first configuration information correspond to one or more sidelinks, each piece of the first configuration information is used to configure a discontinuous reception DRX related parameter of a corresponding sidelink, and the first terminal device is a sending device or a receiving device on the one or more sidelinks. The first terminal device maintains, based on each piece of the first configuration information, a status of the discontinuous reception DRX corresponding to each piece of the first configuration information.

With reference to the second aspect, in some implementations of the second aspect, that the first terminal device determines one or more pieces of configuration information includes: The first terminal device determines, based on a first message of each of the one or more sidelinks, the first configuration information corresponding to each sidelink, where the first message of each sidelink includes the first configuration information corresponding to each sidelink. Alternatively, the first terminal device determines, based on system pre-configuration information of the first terminal device, the one or more pieces of first configuration information. For example, the first message is received by the first terminal device from at least one of the following devices: a sending device on each sidelink, a receiving device on each sidelink, or a network device.

With reference to the second aspect, in some implementations of the second aspect, the first configuration information includes one or more of the following information elements:
a first cycle of the DRX;
a second cycle of the DRX, where the second cycle is less than the first cycle;
a start time offset of the DRX;
a parameter of a first timer, where the parameter of the first timer indicates DRX active duration in each cycle;
a parameter of a second timer, where the parameter of the second timer indicates duration in which the receiving device stops receiving transmission of a HARQ process after receiving sidelink control information SCI for scheduling scheduled data of the HARQ process;
a parameter of a third timer, where the parameter of the third timer indicates maximum DRX active duration of the receiving device for receiving SCI for scheduling retransmitted data of a HARQ process;
a parameter of a fourth timer, where the parameter of the fourth timer indicates duration in which the receiving device stays in DRX active time after receiving SCI for scheduling newly transmitted data; or
a parameter of a fifth timer, where the parameter of the fifth timer indicates duration of the DRX in a second cycle.

With reference to the second aspect, in some implementations of the second aspect, the method further includes: when DRX corresponding to one of the one or more sidelinks applies the first cycle, the first terminal device starts or restarts, based on the first cycle and/or a start time offset of the DRX corresponding to the sidelink, a first timer of the DRX corresponding to the sidelink; or when DRX corresponding to one of the one or more sidelinks applies the second cycle, the first terminal device starts or restarts, based on the second cycle and/or a start time offset of the DRX corresponding to the sidelink, a first timer of the DRX corresponding to the sidelink.

With reference to the second aspect, in some implementations of the second aspect, the method further includes: After the first terminal device sends or receives first sidelink control information SCI in DRX active time of the sidelink of the one or more sidelinks, the first terminal device starts or restarts a second timer corresponding to a first HARQ process, and/or stops a third timer corresponding to the first HARQ process. For example, the first SCI is used to schedule newly transmitted data or retransmitted data of the sidelink, and the first HARQ process is a HARQ process used by the first terminal device to process the newly transmitted data or the retransmitted data.

With reference to the second aspect, in some implementations of the second aspect, the method further includes: After the second timer corresponding to the first HARQ process expires, the first terminal device starts or restarts the third timer corresponding to the first HARQ process.

With reference to the second aspect, in some implementations of the second aspect, the first terminal device is a receiving device of the sidelink, and that the first terminal device starts or restarts the third timer corresponding to the first HARQ process includes: When the first terminal device fails to decode data of the first HARQ process, the first terminal device starts or restarts the third timer corresponding to the first HARQ process.

With reference to the second aspect, in some implementations of the second aspect, the method further includes: After the first terminal device sends or receives second SCI in the DRX active time of the sidelink of the one or more sidelinks, the first terminal device starts a fourth timer corresponding to the sidelink. For example, the second SCI is used to schedule the newly transmitted data of the sidelink.

With reference to the second aspect, in some implementations of the second aspect, the method further includes: After the fourth timer corresponding to the sidelink of the one or more sidelinks expires, or after the first terminal device sends or receives third information of the sidelink corresponding to the DRX, if first configuration information corresponding to the sidelink includes the second cycle of the DRX, the first terminal device starts a DRX operation in the second cycle of the sidelink, and starts or restarts a fifth timer corresponding to the sidelink; or if first configuration information corresponding to the sidelink does not include the second cycle, the first terminal device starts a DRX operation in the first cycle of the sidelink. For example, the third information indicates to stop the first timer and/or the fourth timer.

With reference to the second aspect, in some implementations of the second aspect, the method further includes: If the fifth timer corresponding to the sidelink expires, the first terminal device starts the DRX operation in the first cycle corresponding to the sidelink.

With reference to the second aspect, in some implementations of the second aspect, the method further includes: After the first terminal device sends or receives first information in the sidelink of the one or more sidelinks, the first terminal device starts the DRX operation in the first cycle corresponding to the sidelink, where the first information indicates that the first terminal device starts the DRX operation in the first cycle.

With reference to the second aspect, in some implementations of the second aspect, the method further includes: After the first terminal device sends or receives second information in the sidelink of the one or more sidelinks, the first terminal device starts the DRX operation in the second cycle corresponding to the sidelink, where the second information indicates that the first terminal device starts the DRX operation in the second cycle.

With reference to the second aspect, in some implementations of the second aspect, when the first terminal device sends or receives at least one of the first information, the second information, or the third information in the sidelink of the one or more sidelinks, the first terminal device stops the first timer and/or the fourth timer.

With reference to the second aspect, in some implementations of the second aspect, the receiving device of the sidelink is in the DRX active time in one or more of the following cases:
- in a period in which the first timer corresponding to the sidelink runs;
- in a period in which the fourth timer corresponding to the sidelink runs;
- in a period in which a third timer corresponding to at least one HARQ process in the sidelink runs; or
- in a time domain range of a configured grant resource of the sidelink.

With reference to the second aspect, in some implementations of the second aspect, the method further includes: When the first terminal device sends or receives first data on the configured grant resource, the first terminal device starts a third timer corresponding to a second HARQ process, where the first data is data of the second HARQ process in the sidelink.

With reference to the second aspect, in some implementations of the second aspect, the first terminal device is a sending device on the one or more sidelinks, and the method further includes: The first terminal device determines a first resource. The first terminal device determines a second terminal device in the receiving device on the one or more sidelinks, where DRX active time of the second terminal device partially or completely overlaps the first resource in time domain. The first terminal device sends data to the second terminal device on the first resource.

With reference to the second aspect, in some implementations of the second aspect, the first resource is a resource granted by the network device to the first terminal device for sending sidelink data, or the first resource is a resource obtained by the first terminal device from a sidelink resource used for contention.

According to a third aspect, a sidelink communication method is provided. The method may be performed by a first terminal device or a module (for example, a chip) configured on (or used in) the first terminal device. The following describes the method by using an example in which the method is performed by the first terminal device.

The method includes: The first terminal device determines, based on DRX active time of a second terminal device, a second resource from a sidelink resource used for contention, where the second resource is a sidelink resource in the DRX active time of the second terminal device. The first terminal device sends data to the second terminal device on the second resource.

With reference to the third aspect, in some implementations of the third aspect, that the first terminal device determines, based on DRX active time of a second terminal device, a second resource from a sidelink resource used for contention includes: An upper layer of a network protocol of the first terminal device sends fourth information to a lower layer of the network protocol, where the fourth information indicates a time interval at which the data can be sent to the second terminal device, and the time interval is in the DRX time of the second terminal device. The first terminal device determines, based on the fourth information, the second resource from the sidelink resource used for contention. For example, time information includes one or more of the following: a start moment of the time interval, an end moment of the time interval, an offset of the time interval, or a periodicity of the time interval.

According to a fourth aspect, a communication apparatus is provided. The communication apparatus includes: a processing unit, configured to determine one or more pieces of first configuration information, where the one or more pieces of first configuration information correspond to one or more sidelinks, each piece of the first configuration information is used to configure a discontinuous reception DRX related parameter of a corresponding sidelink, and the communication apparatus is a sending apparatus or a receiving apparatus on the one or more sidelinks, where the processing unit is further configured to maintain, based on each piece of the first configuration information, a status of the discontinuous reception DRX corresponding to each piece of the first configuration information; and a transceiver unit, configured to send or receive, in DRX active time corresponding to each piece of the configuration information, data of the corresponding sidelink.

With reference to the fourth aspect, in some implementations of the fourth aspect, the processing unit is specifically configured to determine, based on a first message of each of the one or more sidelinks, the first configuration information corresponding to each sidelink, where the first message of each sidelink includes the first configuration information corresponding to each sidelink; or the processing unit is specifically configured to determine, based on system pre-configuration information of the communication apparatus, the one or more pieces of first configuration information. For example, the first message is received by the transceiver unit from at least one of the following devices: a sending device on each sidelink, a receiving device on each sidelink, or a network device.

With reference to the fourth aspect, in some implementations of the fourth aspect, the first configuration information includes one or more of the following parameters:
 a first cycle of the DRX;
 a second cycle of the DRX, where the second cycle is less than the first cycle;
 a start time offset of the DRX;
 a parameter of a first timer, where the parameter of the first timer indicates DRX active duration in each cycle;
 a parameter of a second timer, where the parameter of the second timer indicates duration in which the receiving device stops receiving transmission of a HARQ process after receiving sidelink control information SCI for scheduling scheduled data of the HARQ process;
 a parameter of a third timer, where the parameter of the third timer indicates maximum DRX active duration of the receiving device for receiving SCI for scheduling retransmitted data of a HARQ process;
 a parameter of a fourth timer, where the parameter of the fourth timer indicates duration in which the receiving device stays in DRX active time after receiving SCI for scheduling newly transmitted data; or
 a parameter of a fifth timer, where the parameter of the fifth timer indicates duration of the DRX in a second cycle.

With reference to the fourth aspect, in some implementations of the fourth aspect, when DRX corresponding to one of the one or more sidelinks applies the first cycle, the processing unit is further configured to start or restart, based on the first cycle and/or a start time offset of the DRX corresponding to the sidelink, a first timer of the DRX corresponding to the sidelink; or when DRX corresponding to one of the one or more sidelinks applies the second cycle, the processing unit is further configured to start or restart, based on the second cycle and/or a start time offset of the DRX corresponding to the sidelink, a first timer of the DRX corresponding to the sidelink.

With reference to the fourth aspect, in some implementations of the fourth aspect, after the transceiver unit sends or receives first sidelink control information SCI in DRX active time of the sidelink of the one or more sidelinks, the processing unit is further configured to start or restart a second timer corresponding to a first HARQ process, and/or stop a third timer corresponding to the first HARQ process. For example, the first SCI is used to schedule newly transmitted data or retransmitted data of the sidelink, and the first HARQ process is a HARQ process used by the processing unit to process the newly transmitted data or the retransmitted data.

With reference to the fourth aspect, in some implementations of the fourth aspect, the processing unit is further configured to: after the second timer corresponding to the first HARQ process expires, start or restart the third timer corresponding to the first HARQ process.

With reference to the fourth aspect, in some implementations of the fourth aspect, the communication apparatus is a receiving apparatus of the sidelink, and the processing unit is further configured to: when failing to decode data of the first HARQ process, start or restart the third timer corresponding to the first HARQ process.

With reference to the fourth aspect, in some implementations of the fourth aspect, after the transceiver unit sends or receives second SCI in the DRX active time of the sidelink of the one or more sidelinks, the processing unit is further configured to start a fourth timer corresponding to the sidelink. For example, the second SCI is used to schedule the newly transmitted data of the sidelink.

With reference to the fourth aspect, in some implementations of the fourth aspect, after the fourth timer corresponding to the sidelink of the one or more sidelinks expires, or after the transceiver unit sends or receives third information of the sidelink corresponding to the DRX, if first configuration information corresponding to the sidelink includes the second cycle of the DRX, the processing unit is further configured to: start a DRX operation in the second cycle of the sidelink, and start or restart a fifth timer corresponding to the sidelink; or if first configuration information corresponding to the sidelink does not include the second cycle, the processing unit is further configured to start a DRX operation in the first cycle of the sidelink. For example, the third information indicates to stop the first timer and/or the fourth timer.

With reference to the fourth aspect, in some implementations of the fourth aspect, if the fifth timer corresponding to the sidelink expires, the communication apparatus starts the DRX operation in the first cycle corresponding to the sidelink.

With reference to the fourth aspect, in some implementations of the fourth aspect, the method further includes: after the transceiver unit sends or receives first information in the sidelink of the one or more sidelinks, the communication apparatus starts the DRX operation in the first cycle corresponding to the sidelink, where the first information indicates that the communication apparatus starts the DRX operation in the first cycle; and/or after the transceiver unit sends or receives second information in the sidelink of the one or more sidelinks, the communication apparatus starts the DRX operation in the second cycle corresponding to the sidelink, where the second information indicates that the communication apparatus starts the DRX operation in the second cycle.

With reference to the fourth aspect, in some implementations of the fourth aspect, when the transceiver unit sends or receives at least one of the first information, the second information, or the third information in the sidelink of the one or more sidelinks, the processing unit is further configured to stop the first timer and/or the fourth timer.

With reference to the fourth aspect, in some implementations of the fourth aspect, the receiving device of the sidelink is in the DRX active time in one or more of the following cases:
  in a period in which the first timer corresponding to the sidelink runs;
  in a period in which the fourth timer corresponding to the sidelink runs;
  in a period in which a third timer corresponding to at least one HARQ process in the sidelink runs; or
  in a time domain range of a configured grant resource of the sidelink.

With reference to the fourth aspect, in some implementations of the fourth aspect, the method further includes: when the transceiver unit sends or receives first data on the configured grant resource, the processor unit is further configured to start a third timer corresponding to a second HARQ process, where the first data is data of the second HARQ process in the sidelink.

With reference to the fourth aspect, in some implementations of the fourth aspect, the communication apparatus is a sending apparatus on the one or more sidelinks. The processing unit is further configured to determine a first resource. The processing unit is further configured to determine a second terminal device in the receiving device on the one or more sidelinks, where DRX active time of the second terminal device partially or completely overlaps the first resource in time domain. The transceiver unit sends data to the second terminal device on the first resource.

With reference to the fourth aspect, in some implementations of the fourth aspect, the first resource is a resource granted by the network device to the communication apparatus for sending sidelink data, or the first resource is a resource obtained by the processing unit from a sidelink resource used for contention.

According to a fifth aspect, a communication apparatus is provided. The communication apparatus includes: a processing unit, configured to determine a first resource, where the processing unit is further configured to determine a second terminal device in a receiving device on one or more sidelinks, where DRX active time of the second terminal device partially or completely overlaps the first resource in time domain; and a transceiver unit, configured to send data to the second terminal device on the first resource.

With reference to the fifth aspect, in some implementations of the fifth aspect, the transceiver unit is specifically configured to receive sidelink grant information sent by a network device, where the grant information is configured to indicate the first resource; and/or the transceiver unit is specifically configured to obtain the first resource from a sidelink resource used for contention.

With reference to the fifth aspect, in some implementations of the fifth aspect, the processing unit is further configured to determine one or more pieces of first configuration information, where the one or more pieces of first configuration information correspond to one or more sidelinks, each piece of the first configuration information is used to configure a discontinuous reception DRX related parameter of a corresponding sidelink, and the communication apparatus is a sending apparatus or a receiving apparatus on the one or more sidelinks; and the processing unit is further configured to maintain, based on each piece of the first configuration information, a status of the discontinuous reception DRX corresponding to each piece of the first configuration information.

According to a sixth aspect, a communication apparatus is provided. The communication apparatus includes: a processing unit, configured to determine, based on DRX active time of a second terminal device, a second resource from a sidelink resource used for contention, where the second resource is a sidelink resource in the DRX active time of the second terminal device; and a transceiver unit, configured to send data to the second terminal device on the second resource.

With reference to the sixth aspect, in some implementations of the sixth aspect, an upper layer of a network protocol of the processing unit sends fourth information to a lower layer of the network protocol, where the fourth information indicates a time interval at which the data can be sent to the second terminal device, and the time interval is in the DRX time of the second terminal device. The processing unit is specifically configured to determine, based on the fourth information, the second resource from the sidelink resource used for contention. For example, time information includes one or more of the following: a start moment of the time interval, an end moment of the time interval, an offset of the time interval, or a periodicity of the time interval.

According to a seventh aspect, a communication apparatus is provided and includes a processor. The processor is coupled to a memory, and may be configured to perform the method in the first aspect, the second aspect, or the third aspect and any possible implementations of the first aspect, the second aspect, or the third aspect. Optionally, the communication apparatus further includes the memory. Optionally, the communication apparatus further includes a communication interface, and the processor is coupled to the communication interface.

In an implementation, the communication apparatus is a first terminal device. When the communication apparatus is the first terminal device, the communication interface may be a transceiver or an input/output interface.

In another implementation, the communication apparatus is a chip configured on the first terminal device. When the communication apparatus is the chip configured on the first terminal device, the communication interface may be an input/output interface.

Optionally, the transceiver may be a transceiver circuit. Optionally, the input/output interface may be an input/output circuit.

According to an eighth aspect, a communication apparatus is provided and includes a processor. The processor is coupled to a memory, and may be configured to execute instructions in the memory, to implement the method according to the third aspect and any one of the possible implementations of the third aspect. Optionally, the communication apparatus further includes the memory. Optionally, the communication apparatus further includes a communication interface, and the processor is coupled to the communication interface.

In an implementation, the communication apparatus is a second terminal device. When the communication apparatus is the second terminal device, the communication interface may be a transceiver or an input/output interface.

In another implementation, the communication apparatus is a chip configured on the second terminal device. When the communication apparatus is the chip configured on the second terminal device, the communication interface may be an input/output interface.

Optionally, the transceiver may be a transceiver circuit. Optionally, the input/output interface may be an input/output circuit.

According to a ninth aspect, a processor is provided, and includes an input circuit, an output circuit, and a processing circuit. The processing circuit is configured to: receive a signal through the input circuit, and transmit the signal through the output circuit, to enable the processor to perform the method according to any one of the first aspect to the fourth aspect and the possible implementations of the first aspect to the fourth aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a tenth aspect, a processing apparatus is provided and includes a processor and a memory. The processor is configured to: read instructions stored in the memory, receive a signal through a receiver, and transmit a signal through a transmitter, to perform the method according to any one of the first aspect to the fourth aspect and the possible implementations of the first aspect to the fourth aspect.

Optionally, there are one or more processors, and there are one or more memories.

Optionally, the memory may be integrated with the processor, or the memory and the processor are disposed separately.

In a specific implementation process, the memory may be a non-transitory (non-transitory) memory, such as a read-only memory (ROM). The memory and the processor may be integrated into one chip, or may be separately disposed in different chips. A type of the memory and a manner in which the memory and the processor are disposed are not limited in embodiments of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the tenth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

According to an eleventh aspect, a computer program product is provided. The computer program product includes a computer program (which may also be referred to as code or instructions). When the computer program is run, a computer is enabled to perform the method according to any one of the first aspect to the fourth aspect and the possible implementations of the first aspect to the fourth aspect.

According to a twelfth aspect, a computer-readable medium is provided. The computer-readable medium stores a computer program (which may also be referred to as code or instructions). When the computer program is run on a computer, the computer is enabled to perform the method according to any one of the first aspect to the fourth aspect and the possible implementations of the first aspect to the fourth aspect.

According to a thirteenth aspect, a communication system is provided. The communication system includes the first terminal device and/or the second terminal device described above.

DETAILED DESCRIPTION OF ILLUSTRATIVE EMBODIMENTS

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system or a new radio (NR) system, a vehicle-to-everything (V2X) system, where the V2X system may include, for example, a vehicle-to-network (V2N) system, a vehicle-to-vehicle (V2V) system, a vehicle-to-infrastructure (V2I) system, or a vehicle-to-pedestrian (V2P) system, a long term evolution-vehicle (LTE-V) system, a machine type communication (MTC) system, an Internet of Things (IoT) system, a long term evolution-machine (LTE-M) system, a machine to machine (M2M) system, a non-terrestrial network (NTN) system, another future evolved communication system, or the like.

Figures 1, 2:
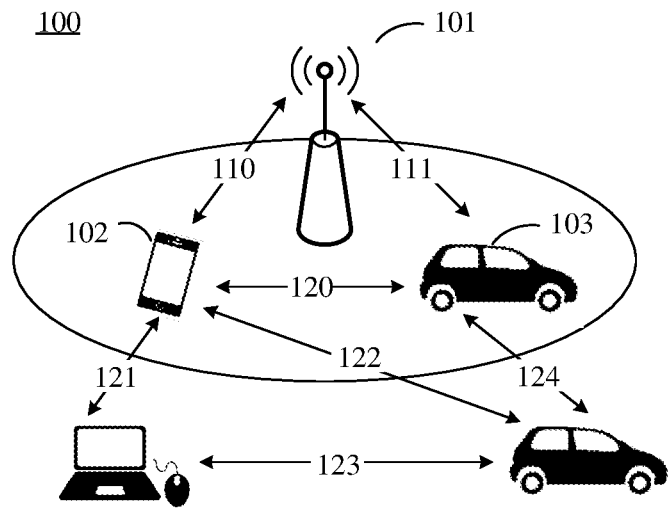
FIG. 1 is a schematic diagram of an architecture of a communication system applicable to an embodiment of this application.
FIG. 2 is a schematic flowchart of a sidelink communication method according to an embodiment of this application.

FIG. 1 is a schematic diagram of a communication system 100 applicable to an embodiment of this application.

The communication system applicable to an embodiment of this application may include at least two terminal devices, for example, terminal devices 102, 103, 104, and 105 in the communication system 100 shown in FIG. 1. The communication system applicable to an embodiment of this application may further include at least one network device, for example, a network device 101 in the communication system 100 shown in FIG. 1. A sidelink (SL) may be established between the at least two terminal devices, for example, links 120, 121, 122, 123, and 124 in FIG. 1. The terminal devices that have established the sidelink may directly communicate with each other. One terminal device may establish one or more sidelinks with one or more terminal devices, the terminal device may perform a discontinuous reception (DRX) operation, and the terminal device may receive, in DRX active time, data sent by the one or more terminal devices that have established one or more sidelinks with the terminal device. The terminal device in the communication system may also establish a wireless connection with the network device for data communication. The terminal devices 102 and 103 shown in FIG. 1 respectively establish radio links 110 and 111 with the network device. Alternatively, the terminal device, for example, the terminal device 104 or 105 shown in the FIG. 1, in the communication system may not establish the radio link with the network device. This is not limited in this application.

The terminal device in embodiments of this application may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (pad), a computer with a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, an in-vehicle communication apparatus, an in-vehicle communication processing chip, a wearable device, a terminal device in a 5G network, a terminal device in a future evolved public land mobile network (PLMN), or the like.

The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smartwatches or smart glasses, and devices that focus on only one type of application function and need to work with other devices such as smartphones, such as various smart bands or smart jewelry for monitoring physical signs.

In addition, the terminal device may alternatively be a terminal device in an Internet of Things (IoT) system. The IoT is an important part of future information technology development. A main technical feature of the IoT is to connect things to a network by using a communication technology, to implement an intelligent network for human-machine interconnection and thing-thing interconnection.

It should be understood that, a specific form of the terminal device is not limited in this application.

The technical solutions in embodiments of this application may be further applied to a network device. The network device includes but is not limited to: an evolved NodeB (eNB), a radio network controller (RNC), a road side unit (RSU), a NodeB (NB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like. Alternatively, the network device may be a gNB or a transmission point (TRP or TP) in a 5G (for example, NR) system, or one antenna panel or a group of antenna panels (including a plurality of antenna panels) of a base station in a 5G system. Alternatively, the network device may be a network node that constitutes a gNB or a transmission point, for example, a baseband unit (BBU) or a distributed unit (DU). Alternatively, the network device may be a network side apparatus that provides a communication service or communication control for a terminal device in the Internet of Vehicles.

The network device provides a communications service for a terminal device in a cell. The terminal device in the cell communicates with the network device by using a transmission resource (for example, a frequency domain resource or a time domain resource) allocated by the network device. The cell may belong to a macro base station (for example, a macro eNB or a macro gNB).

To facilitate understanding of embodiments of this application, terms used in this application are first briefly described.

1. Broadcast or Multicast Communication Mode of a Sidelink

Broadcast or multicast means that broadcast or multicast data sent by a sending device can be received by one or more terminal devices. For example, a destination layer-2 identifier (Destination Layer-2 ID) used when service data is transmitted on a PC5 interface is predefined. When the broadcast service data is to be sent, the sending device may directly send the broadcast service data by using a user plane protocol stack, and add the Destination Layer-2 ID corresponding to the broadcast service to a media access control (MAC) layer and/or a physical layer (PHY) layer. A terminal device interested in the broadcast service may monitor, at the PHY layer, whether there is service data of the Destination Layer-2 ID corresponding to the broadcast service, and perform receiving and parsing. However, this application is not limited thereto.

2. Unicast Communication Mode of a Sidelink

Unicast is a one-to-one communication mode of terminal devices. A sending device indicates, based on a destination address, a receiving device of unicast data sent by the sending device. The receiving device determines, based on the destination address of the unicast data, whether the unicast data is unicast data sent to the receiving device, and determines, based on a source address of the unicast data, a specific device that sends the unicast data. Optionally, two terminal devices may establish a unicast connection between the two devices by using signaling exchange, and unicast communication may be performed after the unicast connection is established.

3. Sidelink Transmission Mode 1 (Mode 1)

A sidelink mode 1 means that a terminal device determines, based on a sidelink grant sent by a network device, a resource used to send sidelink data. The sidelink grant is used to grant the terminal device a dedicated resource for sending the sidelink data. For example, before sending the sidelink data, the terminal device reports a buffer status report (BSR) to the network device, to notify the network device of an amount of data to be sent. The network device grants a corresponding resource to the terminal device based on the amount of data reported by the terminal device.

4. Sidelink Transmission Mode 2 (Mode 2)

A sidelink mode 2 means that a network device preallocates resources used for a sidelink, and a plurality of terminal devices may contend for a resource in the resources used for the sidelink. When obtaining the resource through contention, the terminal device may send data of the sidelink on the resource obtained through contention. For example, the terminal device selects an unoccupied resource for transmission by measuring whether each time-frequency resource in the resources used for the sidelink is occupied. However, this application is not limited thereto.

The following describes in detail a sidelink communication method provided in embodiments of this application with reference to the drawings.

FIG. 2 is a schematic flowchart of a sidelink communication method according to an embodiment of this application.

S210: A first terminal device determines one or more pieces of first configuration information.

The one or more pieces of the first configuration information correspond to one or more sidelinks, and each piece of the first configuration information is used to configure a discontinuous reception (DRX) related parameter of a corresponding sidelink. The first terminal device performs a DRX operation on the one or more sidelinks, and maintains a status of one or more pieces of DRX. The one or more pieces of DRX are in one-to-one correspondence with the one or more sidelinks, and one sidelink includes one sending device and one receiving device. An identifier of a receiving device and an identifier of a sending device may be used to uniquely identify a sidelink. In other words, the sidelink may be determined based on the identifier of the receiving device and the identifier of the sending device.

Optionally, the identifier of the receiving device and/or the identifier of the sending device may be a layer 2 identifier or a layer 1 identifier. The sending device may identify the receiving device based on a layer 2 identifier or a layer 1 identifier of the receiving device, and the receiving device may identify the sending device based on a layer 2 identifier or a layer 1 identifier of the sending device. The identifier of the sending device and the identifier of the receiving device may be used to identify the sidelink. A sidelink on which the DRX operation is performed may also be referred to as a DRX device group or a DRX device pair.

Optionally, a sidelink type may be identified based on a communication type (for example, may be written as cast-type), and the communication type may include broadcast, multicast, and unicast.

For example, for broadcast or multicast, a cast-type and an identifier of a sending device may identify sidelinks between the sending device and a plurality of receiving devices for broadcast or multicast. Alternatively, a cast-type and an identifier of a receiving device may identify one sidelink between the receiving device and a sending device for broadcast or multicast. Alternatively, a cast-type, an identifier of a sending device and an identifier of a receiving device may identify one sidelink between the receiving device and the sending device.

The first terminal device may be a sending device in one of the one or more pieces of DRX, or may be a receiving device in one of the one or more pieces of DRX. The receiving device in the DRX receives, in DRX active time, sidelink data corresponding to the DRX, and the sending device in the DRX sends, in the DRX active time of the receiving device in the DRX, the data to the receiving device in the DRX.

Therefore, both the sending device and the receiving device need to determine the DRX active time, to ensure that the sending device sends data in a receiving state of the receiving device.

In an implementation, the receiving device in the DRX sends a message A to the sending device in the DRX, and the message A includes configuration information of the DRX.

In another implementation, the sending device in the DRX sends a message B to the receiving device in the DRX, and the message B includes configuration information of the DRX.

By way of example and not limitation, the message A and/or the message B may be at least one of the following messages: a sidelink radio resource control (RRC) message, a system information block (SIB), a service data adaptation protocol (SDAP) message, a packet data convergence layer protocol (PDCP) message, a radio link control (RLC) message, media access control (MAC) message, sidelink control information (SCI), or PC5 signaling (PC5-S).

In another implementation, the first terminal device receives a message C sent by a network device, where the message C is configured to indicate configuration information of DRX of a sidelink. In other words, the network device may configure the configuration information of the DRX for the receiving device in the DRX and/or the sending device in the DRX. The message C may be an RRC message or a system message sent by the network device to the first terminal device.

In another implementation, system pre-configuration information of the first terminal device includes configuration information of the DRX of the one or more sidelinks.

For example, system pre-configuration information of each terminal device has a set of configuration information of DRX of a sidelink. When each terminal device needs to perform a DRX operation, the terminal device maintains a status of DRX based on the configuration information of DRX of a sidelink preconfigured by the system. That is, the configuration information of the one or more pieces of DRX is the same. However, this application is not limited thereto.

S220: The first terminal device maintains, based on each piece of the first configuration information, a status of the discontinuous reception DRX corresponding to each piece of the first configuration information.

The first configuration information includes one or more of the following parameters:

a first cycle of the DRX;

a second cycle of the DRX, where the second cycle is less than the first cycle;

a start time offset of the DRX;

a parameter of a first timer, where the parameter of the first timer indicates DRX active time in each DRX cycle;

a parameter of a second timer, where the parameter of the second timer indicates duration in which a receiving device stops receiving transmission of a HARQ process after receiving sidelink control information SCI for scheduling scheduled data of the HARQ process;

a parameter of a third timer, where the parameter of the third timer indicates maximum DRX active duration of a receiving device for receiving SCI for scheduling retransmitted data of a HARQ process;

a parameter of a fourth timer, where the parameter of the fourth timer indicates duration in which a receiving device stays in DRX active time after receiving SCI for scheduling newly transmitted data; or a parameter of a fifth timer, where the parameter of the fifth timer indicates duration of the DRX in a second cycle.

The first terminal device may determine start time of a DRX cycle based on a cycle and/or a start time offset of each piece of DRX, where the time offset may include a start offset and/or a slot offset.

When DRX corresponding to one of the one or more sidelinks applies the first cycle, the first terminal device determines, based on the first cycle and/or a start time offset of the DRX corresponding to the sidelink, start time of a DRX cycle, and starts or restarts a first timer of the DRX corresponding to the sidelink. Start time of each DRX cycle in the first cycle may be determined in the following manner:

$$[(DFN \times 10) + \text{subframe number}] \bmod (drx\text{-Long-Cycle}) = drx\text{-StartOffset}$$

DFN is a direct frame number (DFN) in which the start time is located, subframe number is a subframe number of a subframe in which the start time is located in the DFN, drx-StartOffset is the start time offset, and drx-LongCycle is the first cycle.

The start time is indicated by drx-SlotOffset relative to a boundary of the subframe, and drx-SlotOffset is the slot offset. The first terminal device starts or restarts the first timer after the drx-SlotOffset relative to the boundary of the subframe.

When DRX corresponding to one of the one or more sidelinks applies the second cycle, the first terminal device starts or restarts, based on the second cycle and/or a start time offset of the DRX corresponding to the sidelink, a first timer corresponding to the sidelink. When the first timer runs, a receiving device in the DRX is in DRX active time, and can receive data on the sidelink corresponding to the DRX. Start time of each DRX cycle in the second cycle may be determined in the following manner:

$$[(DFN \times 10) + \text{subframe number}] \bmod (drx\text{-Short-Cycle}) = (drx\text{-StartOffset}) \bmod (drx\text{-ShortCyle})$$

drx-ShortCycle is the first cycle.

The start time is indicated by drx-SlotOffset relative to a boundary of a subframe. The first terminal device starts or restarts the first timer after the drx-SlotOffset relative to the boundary of the subframe.

Figure 3:
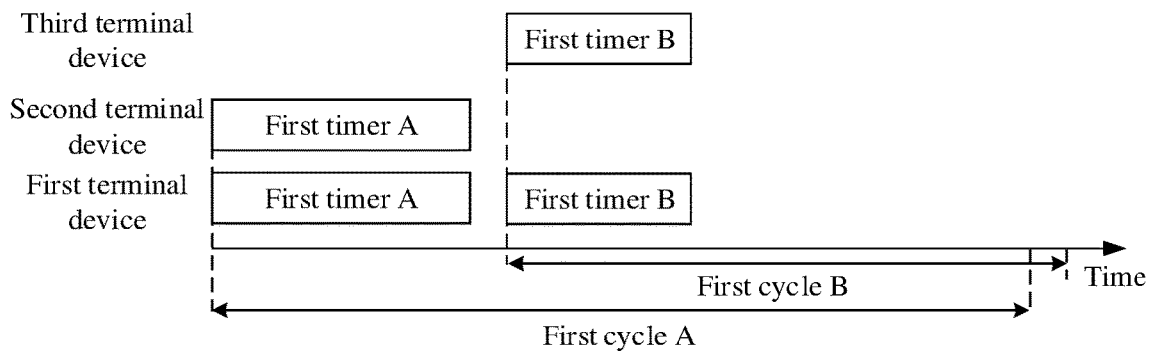
FIG. 3 is a schematic diagram of starting a first timer according to an embodiment of this application.

For example, as shown in FIG. 3, a first terminal device performs a first DRX operation with a second terminal device on a sidelink, and performs a second DRX operation with a third terminal device on a sidelink B; and the first terminal device and the third terminal device determine start time of first DRX based on a first cycle A of the first DRX and a start time offset A of the first DRX, and start a first timer A of the first DRX. The first terminal device is a sending device in the first DRX. The first terminal device may send data to the second terminal device in a period in which the first timer A runs. In other words, the first terminal device may send, in the period in which the first timer A runs, the data that is on the sidelink and that corresponds to the first DRX. If the first terminal device has no data to be sent on the sidelink, the first terminal device does not send data to the second terminal device in the period in which the first timer A runs. The second terminal device monitors the data on the sidelink in the period in which the first timer A runs. The period in which the first timer A runs belongs to active time of the first DRX.

In addition, if second DRX applies a first cycle of the second DRX, the first terminal device and the third terminal device determine start time of the second DRX based on the first cycle B of the second DRX and a start time offset B of the second DRX, and start a first timer B of the second DRX, where the first terminal device is a receiving device in the second DRX, and monitors data sent by the third device in a period in which the first timer B runs. The period in which the first timer B runs belongs to active time of the second DRX.

That is, the first terminal device determines start time of each piece of DRX based on a first cycle and a start time offset configured for each of one or more pieces of DRX, and starts or restarts, at the start time of each piece of DRX, a first timer corresponding to each piece of DRX.

In an implementation, after the terminal device sends or receives first SCI in the DRX active time of the sidelink of the one or more sidelinks, the first terminal device starts or restarts a second timer corresponding to a first HARQ process, and/or stops a third timer corresponding to the first HARQ process. For example, the first SCI is used to schedule newly transmitted data or retransmitted data of the sidelink, and the first HARQ process is a HARQ process used by the terminal device to process the newly transmitted data or the retransmitted data.

For example, if a terminal device A detects first SCI in active time of second DRX of a sidelink, the terminal device A starts a second timer of a HARQ process for processing newly transmitted data or retransmitted data. If a third timer of the HARQ process is running in this case, the terminal device A stops the third timer of the HARQ process.

Figure 4:
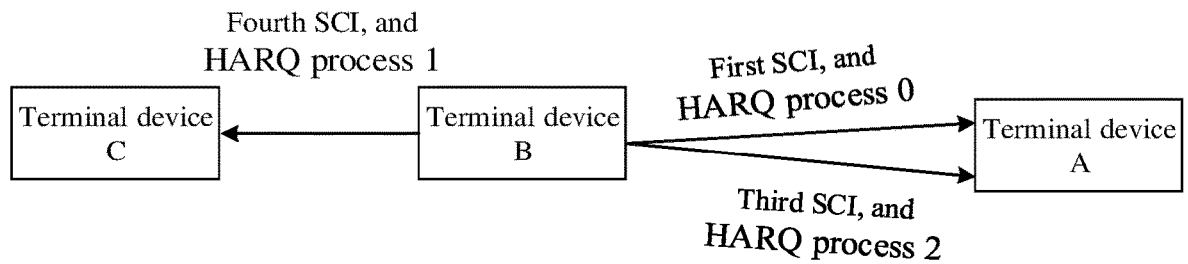
FIG. 4 is a schematic diagram of a method for determining a HARQ process according to an embodiment of this application.

Optionally, if the first SCI schedules newly transmitted data, a sending device, namely, a terminal device B, on the sidelink selects an empty HARQ process for the terminal device B to process the newly transmitted data. For example, when the terminal device B is processing data of a terminal device C by using a HARQ process 1, and a HARQ process 0 is an empty HARQ process, the terminal device B may select the HARQ process 0 (namely, an example of the first HARQ process) to process the newly transmitted data. The terminal device B associates the HARQ process 0 with an identifier of the terminal device A, in other words, associates the HARQ process 0 with the sidelink. As shown in FIG. 4, an identifier of a HARQ process indicated in the first SCI is the HARQ process 0. The identifier of the terminal device A may be a layer 1 identifier or a layer 2 identifier. However, this application is not limited thereto. Optionally, the HARQ process 0 may be associated with the cast-type and the identifier of the terminal device A.

After sending the first SCI to the terminal device A, the terminal device B starts a second timer corresponding to the HARQ process 0, and waits for a feedback from the terminal device A. If the terminal device A successfully receives the newly transmitted data, the terminal device A releases the HARQ process 0. If the terminal device A fails to receive the newly transmitted data, the terminal device A continues to perform data retransmission by using the HARQ process 0.

If the terminal device B still has more data to be sent to the terminal device A, the terminal device B may select one empty HARQ process (for example, a HARQ process 2) again to maintain the data and wait for a feedback. If the terminal device B still has data to be sent to another terminal device, the terminal device B may select one empty HARQ process again.

After receiving the first SCI for scheduling the newly transmitted data, the terminal device A selects an empty HARQ process (for example, a HARQ process 1, namely, another example of the first HARQ process) to process the newly transmitted data. In addition, the HARQ process 1 is associated with an identifier of the terminal device B and the identifier of the HARQ process (namely, the HARQ process 0) that is of the terminal B and that is indicated in the first SCI. In other words, the terminal device A associates the sidelink with the HARQ process 0. Optionally, the HARQ process 1 may be associated with the cast-type and the identifier of the terminal device A; or the HARQ process 1 may be associated with the cast-type, the identifier of the terminal device A, and the identifier of the terminal device B.

After receiving the first SCI, the terminal device A starts a second timer corresponding to the HARQ process 1. Duration of the second timer may be determined based on configuration information of the second DRX. In a period in which the second timer runs, the terminal device A does not receive data of the HARQ process corresponding to the second timer.

If the first SCI schedules retransmitted data, the terminal device A determines the associated HARQ process 1 based on the identifier of the terminal device B and the identifier 0 of the HARQ process that is of the terminal device B and that is indicated in the first SCI. The HARQ process 1 is a HARQ process used by the terminal device A to process the retransmitted data. After receiving the first SCI, the terminal device A starts a second timer corresponding to the HARQ process 1. Duration of the second timer is determined based on configuration information of the second DRX. In a period in which the second timer runs, the terminal device A does not receive data of the HARQ process corresponding to the second timer.

Optionally, if a third timer corresponding to the HARQ process 1 is running before the terminal device A receives the first SCI, after receiving the first SCI, the terminal device A stops the third timer corresponding to the HARQ process 1, and starts the second timer corresponding to the HARQ process 1.

Optionally, a sending device in the second DRX, namely, the terminal device B, starts the third timer of the HARQ process 1 after the second timer of the HARQ process 1 expires. Alternatively, if the terminal device A fails to decode the newly transmitted data or the retransmitted data scheduled by using the first SCI, the terminal device A starts the third timer of the HARQ process 1 after the second timer of the HARQ process 1 expires. The terminal device A monitors the data of the HARQ process 1 in a period in which the third timer runs.

Optionally, after the third timer expires, the second timer or the third timer is started or restarted.

For example, when a sending device on a sidelink sends data on a configured grant (configured grant) resource in an automatic retransmission manner, the sending device may perform transmission by using a periodic CG resource. For a receiving device on the sidelink, if the receiving device on the sidelink cannot accurately learn of an automatic retransmission periodicity of the sending device, after the third timer expires, the receiving device on the sidelink may periodically start receiving retransmitted data. For example, after the third timer expires, the second timer or the third timer is restarted until maximum times or maximum time is reached or exceeded. Optionally, first configuration information corresponding to the sidelink may include the maximum times or the maximum time. Alternatively, the maximum times or the maximum time is explicitly or implicitly configured in the SCI by the sending device. If the sending device does not support automatic retransmission of configured grant data, the receiving device releases the HARQ process 1 after the third timer expires.

If the terminal device A feeds back an ACK, in other words, the terminal devices successfully decodes the newly transmitted data or the retransmitted data scheduled by using the first SCI, after the second timer of the HARQ process 1 expires, the terminal device A does not start or restart the third timer of the HARQ process 1, releases the HARQ process 1, and simultaneously stops the second timer and/or the third timer associated with the HARQ process, so that the HARQ process 1 becomes an empty process and may be used to process other received data.

Optionally, if the first SCI schedules newly transmitted data, the terminal device A and the terminal device B start a fourth timer corresponding to the second DRX. The terminal device A is in active time of the second DRX in a period in which the fourth timer runs. In other words, the terminal device A monitors data on the sidelink corresponding to the second DRX in the period in which the fourth timer runs, that is, monitors data sent by the terminal device B.

Optionally, after the fourth timer of the second DRX expires, if the second DRX is configured with a second cycle, the terminal device A and the terminal device B start the second DRX of the second cycle, and start or restart a fifth timer of the second DRX; if no second cycle is configured for the second DRX, the terminal device A and the terminal device B start a second DRX operation in a first cycle.

Optionally, after the terminal device B sends third information and the terminal device A receives the third information, if the second DRX is configured with the second cycle, the terminal device A and the terminal device B start the second DRX of the second cycle, and start or restart the fifth timer of the second DRX; if no second cycle is configured for the second DRX, the terminal device A and the terminal device B start the second DRX operation in the first cycle. The third information indicates to stop the first timer and/or the second timer that are/is running.

Optionally, when the terminal device A starts the fifth timer of the second DRX, if the terminal device A does not receive the data on the sidelink in the period in which the fifth timer runs, the terminal device A starts the second DRX operation in the first cycle; if the terminal device A receives the data on the sidelink in the period in which the fifth timer runs, the terminal device A restarts the fifth timer.

For example, the first terminal device may be the terminal device A or the terminal device B in the foregoing example. To be specific, the first terminal device may perform operations of the terminal device A when serving as a receiving device in DRX, or the first terminal device may perform operations of the terminal device B when serving as a sending device in the DRX.

In an implementation, after the first terminal device sends or receives first information in the sidelink of the one or more sidelinks, the first terminal device starts a DRX operation in the first cycle corresponding to the sidelink, where the first information indicates that the first terminal device starts the DRX operation in the first cycle.

For example, a terminal device A sends the first information on a sidelink, and indicates, based on the first information, a receiving device, namely, the terminal device B, on a sidelink, to start first DRX of the first cycle corresponding to the sidelink. After sending the first information, the first terminal device starts a first DRX operation, to be specific, determines DRX active time of the receiving device in the first DRX based on the first cycle of the first DRX. After receiving the first information, the terminal device B starts the first DRX of the first cycle, and the first cycle is determined by configuration information of the first DRX.

According to the foregoing solution, the first terminal device determines, based on the receiving device and a sending device that are of the first information in the sidelink, the corresponding first DRX, and starts, based on the first cycle configured for the first DRX, the DRX of the first cycle. In this way, the first terminal device can maintain the DRX on the sidelink.

Optionally, if a fifth timer of the first DRX is running, the first terminal device stops the fifth timer after sending or receiving the first information.

In an implementation, after the first terminal device sends or receives second information in the sidelink of the one or more sidelinks, the first terminal device starts a DRX operation in the second cycle corresponding to the sidelink, where the second information indicates that the first terminal device starts the DRX operation in the second cycle.

Optionally, after the first terminal device sends or receives the first information and/or the second information in the sidelink of the one or more sidelinks, the first terminal device stops a first timer and/or a fourth timer of the first DRX. In other words, after sending or receiving the first information and/or the second information, the first terminal device stops a timer that enables the first DRX to be in active time, so that the receiving device corresponding to the first DRX enters inactive time of the first DRX. Then, the first terminal device starts, based on the foregoing case, the first DRX of the first cycle or the second cycle.

By way of example and not limitation, one or more of the first information, the second information, and the third information is MAC CE signaling.

S220: The first terminal device determines that a status of at least one of the one or more pieces of DRX is the DRX active time.

Based on the descriptions in S210, the first terminal device maintains a status of DRX of each measurement link by using each timer, and the first terminal device may determine that a receiving device on a sidelink is in the DRX active time in one or more of the following cases:

in a period in which the first timer corresponding to the sidelink runs;

in a period in which the fourth timer corresponding to the sidelink runs;

in a period in which a third timer corresponding to at least one HARQ process in the sidelink runs; or in a time domain range of a configured grant resource of the sidelink.

Optionally, different active time may be defined for newly transmitted data and retransmitted data.

For example, the first terminal device may determine a receiving device depending on whether data is retransmitted data or newly transmitted data and based on a running status of a DRX timer on a sidelink in a time domain range of a first resource.

If the data that the first terminal device needs to send to the receiving device is the newly transmitted data, the first terminal device determines, depending on whether a first timer and/or a fourth timer of DRX of the receiving device run/runs in the time domain range of the first resource, whether the first terminal device can send the newly transmitted data to the receiving device on the first resource. If the first timer and/or the fourth timer run/runs, the data can be sent; if the first timer and/or the fourth timer do/does not run, the data cannot be sent.

If the data that the first terminal device needs to send to the receiving device is the retransmitted data, the first terminal device determines, depending on whether a third timer runs in the time domain range of the first resource, whether the first terminal device can send the retransmitted data to the receiving device on the first resource, where the third timer is maintained by a sending device; the third timer is used when data retransmission corresponding to the receiving device is performed; and the third timer is associated with sending of a HARQ process. If the third timer runs, the data can be sent; if the third timer does not run, the data cannot be sent.

(The active time, DRX or an operation, or exception handling for receiving DRX off are separately defined for new transmission/retransmission.)

Optionally, a terminal device may determine a DRX active time set based on DRX active time of K sidelinks, and the terminal device is a receiving device on the K sidelinks. The terminal device detects and receives SCI and/or data of the K sidelinks in the DRX active time set. Optionally, after successfully decoding one piece of SCI, the terminal device may determine, based on the SCI, a sidelink corresponding to the SCI. If a moment at which the SCI is received belongs to DRX active time of the sidelink, the terminal device continues to process data indicated by the SCI; if a moment at which the SCI is received does not belong to DRX active time of the sidelink, the terminal device discards the SCI and the data indicated by the SCI.

S230: The first terminal device receives or sends data on a sidelink corresponding to the at least one piece of DRX.

The first terminal device determines, in S220, that the at least one piece of DRX is in the active time. If the first terminal device is a receiving device of the at least one piece of DRX, the first terminal device monitors, in the DRX active time of the at least one piece of DRX, data on a sidelink corresponding to each piece of DRX. When the first terminal device is a sending device of the at least one piece of DRX, the first terminal device may send, in the DRX active time of the at least one piece of DRX, data on a sidelink corresponding to the DRX to the receiving device. If there is no data to be sent, the first terminal device does not send data to the receiving device in the DRX active time.

In an implementation, after receiving second data on the configured grant resource, the first terminal device starts a second timer of a HARQ process for processing the second data. If a third timer of the HARQ process is running in this case, the first terminal device stops the third timer of the HARQ process. Optionally, after sending a HARQ feedback of the second data, the first terminal device may start the second timer of the HARQ process for processing the second data.

In an implementation, the first terminal device serves as a sending device, and needs to determine, before sending data, a resource for sending the data. The first terminal device may determine, in at least one of the following manners, a resource for sending data on a sidelink.

Manner 1: When the first terminal device obtains a first resource granted by the network device, the first terminal device determines a receiving device, and sends the data to the receiving device on the first resource.

Optionally, the first terminal device may determine the first resource based on a received sidelink grant (SL grant).

Optionally, the first terminal device may obtain, through contention, the first resource from a sidelink resource that is granted by the network device and that is used for contention.

In an implementation, the first terminal device may determine a receiving device based on the time domain range of the first resource and active time of the one or more pieces of DRX. If DRX active time of a terminal device overlaps or partially overlaps the first resource, the terminal device may serve as the receiving device, and the first terminal device may send data to the receiving device on a resource on which the DRX active time of the receiving device overlaps the first resource. If there is no intersection between DRX active time of a terminal device and the first resource, the terminal device cannot serve as the receiving device.

Optionally, the first terminal device may also send multicast data on the first resource, and the first terminal device determines that a group of terminal devices may receive the data in the time range of the first resource. For example, when DRX active time of the group of terminal devices partially or completely overlaps the first resource, or when some terminal devices in the group of terminal devices are in a continuous receiving state (in other words, do not perform a DRX operation), and DRX active time of the other terminal devices overlap or partially overlap the first resource, the first terminal device sends the multicast data for the group of terminal devices on a resource that is of the group of terminal devices in a DRX active state and that is in the first resource.

Manner 2: After the first terminal device determines that the data needs to be sent to a second terminal device, the first terminal device obtains, through contention and based on DRX active time of the second terminal device, a second resource in the DRX active time of the second terminal device, and the first terminal device sends the data to the second terminal device on the second resource.

Optionally, an upper layer of a network protocol of the first terminal device determines a time interval for sending the data to the second terminal device, and notifies a lower layer of the network protocol.

Figure 5:
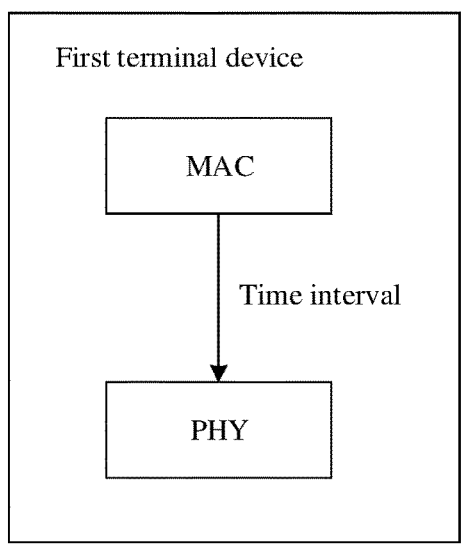
FIG. 5 is a schematic diagram of a method for determining a time interval according to an embodiment of this application.

For example, the upper layer of the network protocol of the first terminal device sends fourth information to the lower layer of the network protocol, where the fourth information indicates a time interval for sending the data to the second terminal device. By way of example and not limitation, as shown in FIG. 5, the upper layer of the network protocol of the network protocol may be a MAC layer, and the lower layer may be a physical (PHY) layer. The MAC layer notifies the physical layer of the time interval for sending the data to the second terminal device.

Optionally, for the newly transmitted data, the time interval may be the DRX active time of the second terminal device; and/or for the retransmitted data, the time interval may be a third timer of a HARQ process for processing the retransmitted data.

Figure 6:
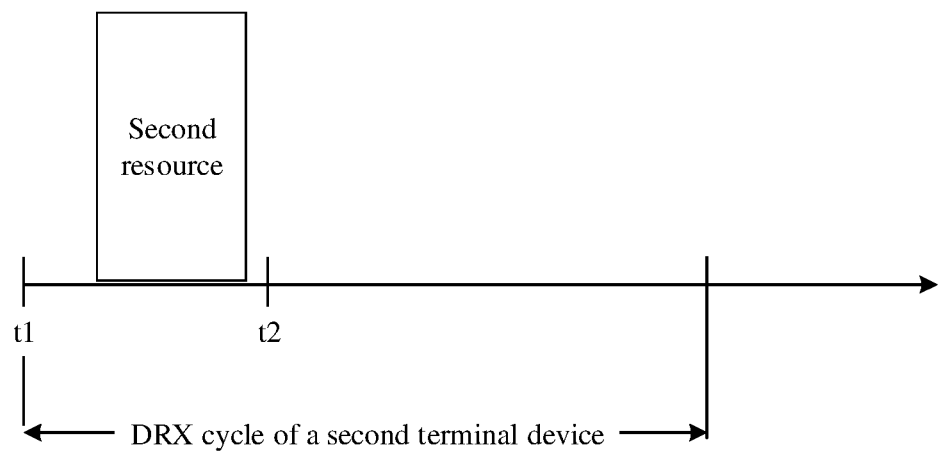
FIG. 6 is a schematic diagram of another method for determining a time interval according to an embodiment of this application.

By way of example and not limitation, as shown in FIG. 6, the fourth information includes a start time moment t1 and an end moment t2 of the time interval, and the lower layer contends, based on the start time moment t1, the end moment t2, and an offset, for the second resource used to transmit the data to the second terminal device.

Optionally, the fourth information may further include the offset of the time interval. The lower layer determines the second resource based on the start time moment t1, the end moment t2, and the offset.

Optionally, the second resource is a periodic time resource. A periodicity of the second resource may be indicated by the fourth information, or a periodicity of the second resource may be equal to a periodicity of the sidelink resource used for contention. The lower layer determines the second resource based on the start time moment t1, the end moment t2, and the periodicity, or the lower layer determines the second resource based on the start time moment t1, the end moment t2, the offset, and the periodicity, where if the first terminal device fails to obtain the resource through contention in one periodicity, the first terminal device may contend for the resource in a next periodicity.

After receiving the fourth information, the lower layer of the network protocol contends for the second resource on the sidelink resource used for contention. If the lower layer of the network protocol obtains the second resource through contention, the first terminal device sends the data to the second terminal device on the second resource; if the lower layer of the network protocol fails to obtain the second resource through contention, the first terminal device does not send the data to the second terminal device on the second resource.

It should be understood that performing some steps in the figure or adjusting a sequence of the steps for specific implementation falls within the protection scope of this application.

The foregoing describes in detail the methods provided in embodiments of this application with reference to FIG. 3 to FIG. 6. The following describes in detail the apparatuses provided in embodiments of this application with reference to FIG. 7 and FIG. 8.

Figure 7:
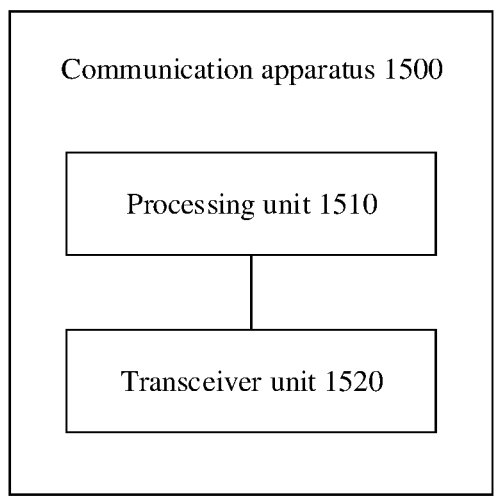
FIG. 7 is a schematic block diagram of an example of a communication apparatus according to this application.

FIG. 7 is a schematic block diagram of a communication apparatus according to an embodiment of this application. As shown in FIG. 7, the communication apparatus 1500 may include a processing unit 1510 and a transceiver unit 1520.

In a possible design, the communication apparatus 1500 may correspond to the first terminal device in the foregoing method embodiments, or may be configured on (or used in) a chip in the first terminal device.

It should be understood that the communication apparatus 1500 may correspond to the first terminal device that performs the method 200 in embodiments of this application, or the communication apparatus 1500 may include units configured to perform the method performed by the first terminal device in the method 200 in FIG. 2. The units in the communication apparatus 1500 and the foregoing other operations and/or functions are separately used to implement corresponding procedures of the method 200 in FIG. 2.

For example, when the communication apparatus 1500 is configured to perform the method 200 in FIG. 2, the transceiver unit 1520 may be configured to perform S230 in the method 200, and the processing unit 1510 may be configured to perform S210 and S220 in the method 200. It should be understood that a specific process in which the units perform the foregoing corresponding steps is described in detail in the foregoing method embodiments, and for brevity, details are not described herein again.

It should be further understood that when the communication apparatus 1500 is a chip configured on (or used in) the first terminal device, the transceiver unit 1520 in the communication apparatus 1500 may be an input/output interface or a circuit of the chip, and the processing unit 1510 in the communication apparatus 1500 may be a processor in the chip.

Optionally, the communication apparatus 1500 may further include a processing unit 1510. The processing unit

1510 may be configured to process instructions or data, to implement a corresponding operation.

Optionally, the communication apparatus 1500 may further include a storage unit. The storage unit may be configured to store instructions or data. The processing unit 1510 may execute the instructions or the data stored in the storage unit, so that the communication apparatus implements a corresponding operation. The transceiver unit 1520 in the communication apparatus 1500 may correspond to the transceiver 1610 in the terminal device 1600 shown in FIG. 8, and the storage unit may correspond to the memory in the terminal device 1600 shown in FIG. 8.

It should be understood that a specific process in which the units perform the foregoing corresponding steps is described in detail in the foregoing method embodiments, and for brevity, details are not described herein again.

It should be further understood that, when the communication apparatus 1500 is the terminal device A, the transceiver unit 1520 in the communication apparatus 1500 may be implemented by using a communication interface (for example, a transceiver or an input/output interface). For example, the transceiver unit 1520 may correspond to the transceiver 1610 in the terminal device 1600 shown in FIG. 8. The processing unit 1510 in the communication apparatus 1500 may be implemented by using at least one processor. For example, the processing unit 1510 may correspond to the processor 1620 in the terminal device 1600 shown in FIG. 8. The processing unit 1510 in the communication apparatus 1500 may be implemented by using at least one logical circuit.

In another possible design, the communication apparatus 1500 may correspond to the second terminal device in the foregoing method embodiments, or may be configured on (or used in) a chip in the second terminal device.

It should be understood that the communication apparatus 1500 may correspond to the second terminal device that performs the method 200 in embodiments of this application, or the communication apparatus 1500 may include units configured to perform the method performed by the second terminal device in the method 200 in FIG. 2. The units in the communication apparatus 1500 and the foregoing other operations and/or functions are separately used to implement corresponding procedures of the method 200 in FIG. 2.

It should be further understood that when the communication apparatus 1500 is a chip configured on (or used in) the second terminal device, the transceiver unit 1520 in the communication apparatus 1500 may be an input/output interface or a circuit of the chip, and the processing unit 1510 in the communication apparatus 1500 may be a processor in the chip.

Optionally, the communication apparatus 1500 may further include a processing unit 1510. The processing unit 1510 may be configured to process instructions or data, to implement a corresponding operation.

Optionally, the communication apparatus 1500 may further include a storage unit. The storage unit may be configured to store instructions or data. The processing unit 1510 may execute the instructions or the data stored in the storage unit, so that the communication apparatus implements a corresponding operation. The transceiver unit 1520 in the communication apparatus 1500 may correspond to the transceiver 1610 in the terminal device 1600 shown in FIG. 8, and the storage unit may correspond to the memory in the terminal device 1600 shown in FIG. 8.

It should be understood that a specific process in which the units perform the foregoing corresponding steps is described in detail in the foregoing method embodiments, and for brevity, details are not described herein again.

It should be further understood that, when the communication apparatus 1500 is the second terminal device, the transceiver unit 1520 in the communication apparatus 1500 may be implemented by using a communication interface (for example, a transceiver or an input/output interface). For example, the transceiver unit 1520 may correspond to the transceiver 1610 in the terminal device 1600 shown in FIG. 8. The processing unit 1510 in the communication apparatus 1500 may be implemented by using at least one processor. For example, the processing unit 1510 may correspond to the processor 1620 in the terminal device 1600 shown in FIG. 8. The processing unit 1510 in the communication apparatus 1500 may be implemented by using at least one logical circuit.

In another possible design, the communication apparatus 1500 may correspond to the network device in the foregoing method embodiments, or may be configured on (or used in) a chip in the network device.

It should be understood that the communication apparatus 1500 may correspond to the network device in the method 200 in embodiments of this application, or the communication apparatus 1500 may include units configured to perform the method performed by the network device in the method 200 in FIG. 2. The units in the communication apparatus 1500 and the foregoing other operations and/or functions are separately used to implement corresponding procedures of the method 200 in FIG. 2.

It should be further understood that when the communication apparatus 1500 is a chip configured on (or used in) the network device, the transceiver unit 1520 in the communication apparatus 1500 may be an input/output interface or a circuit of the chip, and the processing unit 1510 in the communication apparatus 1500 may be a processor in the chip.

Optionally, the communication apparatus 1500 may further include a processing unit 1510. The processing unit 1510 may be configured to process instructions or data, to implement a corresponding operation.

Optionally, the communication apparatus 1500 may further include a storage unit. The storage unit may be configured to store instructions or data. The processing unit 1510 may execute the instructions or the data stored in the storage unit, so that the communication apparatus implements a corresponding operation. The transceiver unit 1520 in the communication apparatus 1500 may correspond to the transceiver 1710 in the network device 1700 shown in FIG. 9, and the storage unit may correspond to the memory in the network device 1700 shown in FIG. 9.

It should be understood that a specific process in which the units perform the foregoing corresponding steps is described in detail in the foregoing method embodiments, and for brevity, details are not described herein again.

It should be further understood that, when the communication apparatus 1500 is the network device, the transceiver unit 1520 in the communication apparatus 1500 may be implemented by using a communication interface (for example, a transceiver or an input/output interface). For example, the transceiver unit 1520 may correspond to the transceiver 1710 in the network device 1700 shown in FIG. 9. The processing unit 1510 in the communication apparatus 1500 may be implemented by using at least one processor. For example, the processing unit 1510 may correspond to the processor 1720 in the network device 1700 shown in FIG. 9. The processing unit 1510 in the communication apparatus 1500 may be implemented by using at least one logical circuit.

Figure 8:
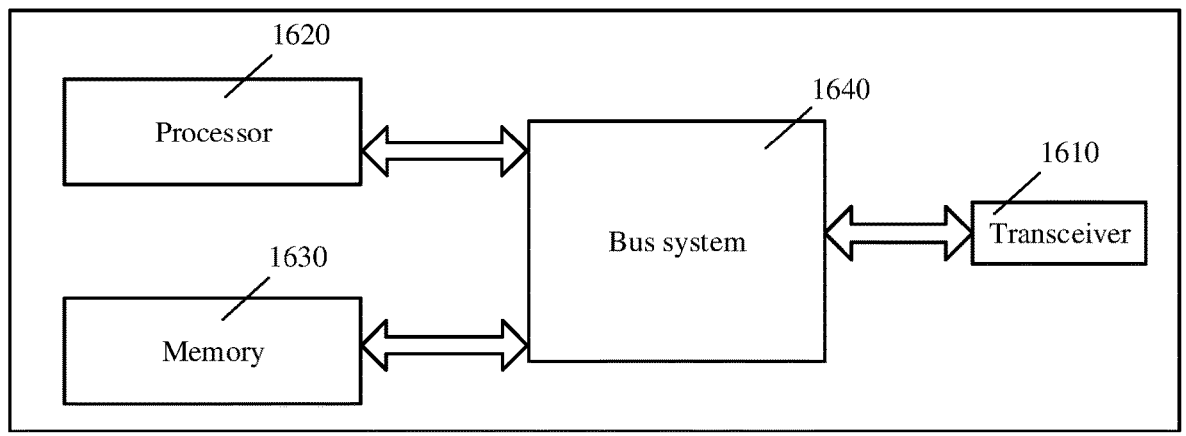
FIG. 8 is a schematic diagram of a structure of an example of a terminal device according to this application.

FIG. 8 is a schematic diagram of a structure of a terminal device 1600 according to an embodiment of this application. The terminal device 1600 may be used in the system shown in FIG. 1, to perform functions of the terminal device in the foregoing method embodiments. As shown in the figure, the terminal device 1600 includes a processor 1620 and a transceiver 1610. Optionally, the terminal device 1600 further includes a memory. For example, the processor 1620, the transceiver 1610, and the memory may communicate with each other through an internal connection path, to transmit a control signal and/or a data signal. The memory is configured to store a computer program. The processor 1620 is configured to execute the computer program in the memory, to control the transceiver 1610 to receive and send a signal. Optionally, the terminal device 1600 may include a bus system 1640. The transceiver 1610, the processor 1620, and the memory 1630 may transmit information via the bus system.

The processor 1620 and the memory may be integrated into a processing apparatus, and the processor 1620 is configured to execute program code stored in the memory to implement the foregoing functions. During specific implementation, the memory may be integrated into the processor 1620, or independent of the processor 1620. The processor 1620 may correspond to the processing unit in FIG. 7.

The transceiver 1610 may correspond to the transceiver unit in FIG. 7. The transceiver 1610 may include a receiver (or referred to as a receiver machine or a receiver circuit) and a transmitter (or referred to as a transmitter machine or a transmitter circuit). For example, the receiver is configured to receive a signal, and the transmitter is configured to transmit a signal.

It should be understood that the terminal device 1600 shown in FIG. 8 can implement the processes related to the terminal device in the method embodiment shown in FIG. 2. Operations and/or functions of the modules in the terminal device 1600 are used to implement the corresponding procedures in the foregoing method embodiments. For details, refer to the descriptions in the foregoing method embodiments. To avoid repetition, detailed descriptions are properly omitted herein.

The processor 1620 may be configured to perform an action that is implemented inside the terminal device and that is described in the foregoing method embodiments. The transceiver 1610 may be configured to perform a sending action by the terminal device for the network device or a receiving action from the network device in the foregoing method embodiments. For details, refer to the descriptions in the foregoing method embodiments. Details are not described herein again.

Optionally, the terminal device 1600 may further include a power supply, configured to supply power to various components or circuits in the terminal device.

In addition, to improve the functions of the terminal device, the terminal device 1600 may further include one or more of an input unit, a display unit, an audio circuit, a camera, a sensor, and the like, and the audio circuit may further include a speaker, a microphone, and the like.

Figure 9:
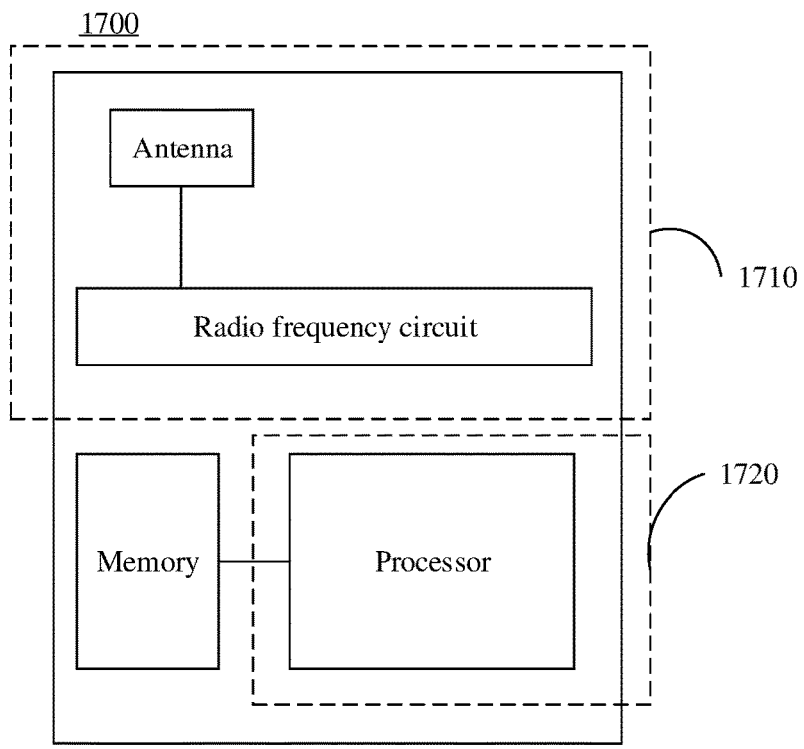
FIG. 9 is a schematic diagram of a structure of an example of a network device according to this application.

FIG. 9 is a schematic diagram of a structure of a network device 1700 according to an embodiment of this application. The network device 1700 may be used in the system shown in FIG. 1, to perform functions of the terminal device in the foregoing method embodiments. As shown in the figure, the network device 1700 includes a processor 1720 and a transceiver 1710. Optionally, the network device 1700 further includes a memory. For example, the processor 1720, the transceiver 1710, and the memory may communicate with each other through an internal connection path, to transmit a control signal and/or a data signal. The memory is configured to store a computer program. The processor 1720 is configured to execute the computer program in the memory, to control the transceiver 1710 to receive and send a signal. Optionally, the transceiver 1710 of the network device 1700 may include an antenna and/or a radio frequency circuit.

It should be understood that the network device 1700 shown in FIG. 9 can implement the processes related to the network device in the method embodiment shown in FIG. 2. Operations and/or functions of modules in the network device 1700 are used to implement corresponding procedures in the foregoing method embodiments. For details, refer to the descriptions in the foregoing method embodiments. To avoid repetition, detailed descriptions are properly omitted herein.

It should be understood that the network device 1700 shown in FIG. 9 is merely a possible architecture of the network device, and should not constitute any limitation on this application. The methods provided in this application are applicable to a network device in another architecture, for example, a network device including a CU, a DU, and an AAU. A specific architecture of the network device is not limited in this application.

An embodiment of this application further provides a processing apparatus, including a processor and an interface. The processor is configured to perform the method according to any one of the foregoing method embodiments.

It should be understood that the processing apparatus may be one or more chips. For example, the processing apparatus may be a field programmable gate array (FPGA), an application-specific integrated circuit (ASIC), a system-on-a-chip (SoC), a central processing unit (CPU), a network processor (NP), a digital signal processor (DSP), a microcontroller unit (MCU), a programmable logic device (PLD), or another integrated chip.

In an implementation process, steps in the foregoing methods can be implemented by using a hardware integrated logical circuit in the processor, or by using instructions in a form of software. The steps of the methods disclosed with reference to embodiments of this application may be directly performed and completed by a hardware processor, or may be performed and completed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware in the decoding processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in embodiments of this application may be a volatile memory or a nonvolatile memory, or may include a volatile memory and a nonvolatile memory. For example, the nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is executed by one or more processors, an apparatus including the processors is enabled to perform the method in the embodiment shown in FIG. 2.

According to the methods provided in embodiments of this application, this application further provides a computer-readable storage medium. The computer-readable storage medium includes program code. When the program code is executed by one or more processors, an apparatus including the processors is enabled to perform the method in the embodiment shown in FIG. 2.

According to the methods provided in embodiments of this application, this application further provides a system, where the system includes the foregoing one or more first terminal devices. The system may further include the foregoing one or more second terminal devices, and/or the system may further include the foregoing one or more network devices.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. For example, there may be one or more processors.

All or a part of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatuses, and units, refer to a corresponding process in the foregoing method embodiments, and details are not described herein again.

In the several embodiments provided in this application, it should be understood that the disclosed system, apparatuses, and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, each functional unit in embodiments of this application may be integrated into one processing unit, or each of the units may exist alone physically, or two or more units are integrated into one unit.

In the foregoing embodiments, all or a part of the functions of the functional units may be implemented by using software, hardware, firmware, or any combination thereof. When software is used to implement embodiments, all or a part of embodiments may be implemented in a form of a computer program product. The computer program product includes one or more computer instructions (programs). When the computer program instructions (programs) are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The software product is stored in a storage medium, and includes several instructions for instructing a computer device (which may be a personal computer, a server, or a network device) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   determining, by a first terminal device, a first resource;
   selecting, by the first terminal device, a second terminal device from one or more sidelink devices to send data to on the first resource, wherein the second terminal device is selected, by the first terminal device, based on a time domain range of the first resource and a discontinuous reception (DRX) active time of the second terminal device, wherein the DRX active time of the second terminal device partially or completely overlaps the first resource in a time domain; and
   sending, by the first terminal device, the data to the second terminal device on the first resource.

2. The method according to claim 1, wherein the determining, by the first terminal device, the first resource comprises:
   receiving, by the first terminal device, sidelink grant information from a network device, based on which the first resource is determined by the first terminal device; or
   obtaining, by the first terminal device, the first resource from a sidelink resource used for contention.

3. The method according to claim 2, wherein the obtaining, by the first terminal device, the first resource from the sidelink resource used for contention comprises:
   determining, by the first terminal device based on the DRX active time of the second terminal device, the first resource from the sidelink resource used for contention, the first resource being in the DRX active time of the second terminal device.

4. The method according to claim 3, wherein the determining, by the first terminal device based on the DRX active time of the second terminal device, the first resource from the sidelink resource used for contention comprises:

sending, by a media access control (MAC) layer of the first terminal device, the DRX active time of the second terminal device to a physical layer of the first terminal device; and determining, by the first terminal device, the first resource from the sidelink resource used for contention based on the DRX active time of the second terminal device.

5. The method according to claim 1, further comprising:

determining, by the first terminal device, first configuration information corresponding to a sidelink, the first configuration information comprising a DRX related parameter of the sidelink, and the first terminal device being a sending device or a receiving device on the sidelink; and maintaining, by the first terminal device based on the first configuration information, a status of a DRX corresponding to the first configuration information.

6. An apparatus, comprising:

at least one processor, and a memory storing instructions for execution by the at least one processor;

wherein, when executed, the instructions cause the apparatus to perform operations comprising:

determining a first resource;

selecting a second terminal device from one or more sidelink devices to send data to on the first resource, wherein the second terminal device is selected, by the apparatus, based on a time domain range of the first resource and a discontinuous reception (DRX) active time of the second terminal device, wherein the DRX active time of the second terminal device partially or completely overlaps the first resource in a time domain; and sending the data to the second terminal device on the first resource.

7. The apparatus according to claim 6, wherein the determining the first resource comprises:

receiving sidelink grant information from a network device, based on which the first resource is determined by the apparatus; or obtaining the first resource from a sidelink resource used for contention.

8. The apparatus according to claim 7, wherein the obtaining the first resource from the sidelink resource used for contention comprises:

determining, based on the DRX active time of the second terminal device, the first resource from the sidelink resource used for contention, the first resource being in the DRX active time of the second terminal device.

9. The apparatus according to claim 8, wherein the determining, based on the DRX active time of the second terminal device, the first resource from the sidelink resource used for contention comprises:

sending, by a media access control (MAC) layer of the apparatus, the DRX active time of the second terminal device to a physical layer; and determining the first resource from the sidelink resource used for contention based on the DRX active time of the second terminal device.

10. The apparatus according to claim 6, wherein the operations further comprise:

determining first configuration information corresponding to a sidelink, the first configuration information comprising a DRX related parameter of the sidelink; and maintaining, based on the first configuration information, a status of a DRX corresponding to the first configuration information.

11. A non-transitory computer readable storage medium comprising computer-executable instructions that, when executed by at least one processor of a first terminal device, cause the first terminal device to perform operations comprising:

determining a first resource;

selecting a second terminal device from one or more sidelink devices to send data to on the first resource, wherein the second terminal device is selected based on a time domain range of the first resource and a discontinuous reception (DRX) active time of the second terminal device, wherein the DRX active time of the second terminal device partially or completely overlaps the first resource in a time domain; and sending the data to the second terminal device on the first resource.

12. The non-transitory computer readable storage medium according to claim 11, wherein the determining the first resource comprises:

receiving sidelink grant information from a network device, based on which the first resource is determined by the first terminal device; or obtaining the first resource from a sidelink resource used for contention.

13. The non-transitory computer readable storage medium according to claim 12, wherein the obtaining the first resource from the sidelink resource used for contention comprises:

determining, based on the DRX active time of the second terminal device, the first resource from the sidelink resource used for contention, the first resource being in the DRX active time of the second terminal device.

14. The non-transitory computer readable storage medium according to claim 13, wherein the determining, based on the DRX active time of the second terminal device, the first resource from the sidelink resource used for contention comprises:

sending, by a media access control (MAC) layer of the first terminal device, the DRX active time of the second terminal device to a physical layer of the first terminal device; and determining the first resource from the sidelink resource used for contention based on the DRX active time of the second terminal device.

15. The non-transitory computer readable storage medium according to claim 11, wherein the operations further comprise:

determining first configuration information corresponding to a sidelink, the first configuration information comprising a DRX related parameter of the sidelink; and maintaining, based on the first configuration information, a status of a DRX corresponding to the first configuration information.

* * * * *